US012782192B2

(12) United States Patent
Ritchie et al.

(10) Patent No.: US 12,782,192 B2
(45) Date of Patent: Nov. 3, 2026

(54) MODULE PACKAGING ARCHITECTURE TO REDUCE CROSSTALK IN AN OPTICAL SENSOR

(71) Applicant: STMicroelectronics International N.V., Geneva (CH)

(72) Inventors: Calum Ritchie, Glasgow (GB); Colin Campbell, Darvel (GB); Matteo Fissore, Edinburgh (GB)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 230 days.

(21) Appl. No.: 18/476,551

(22) Filed: Sep. 28, 2023

(65) Prior Publication Data

US 2025/0109983 A1 Apr. 3, 2025

(51) Int. Cl.

*G01J 1/16* (2006.01)
*G01J 1/02* (2006.01)

(Continued)

(52) U.S. Cl.

CPC ........... *G01J 1/0214* (2013.01); *G01J 1/0266* (2013.01); *G01J 1/0271* (2013.01); *G01J 1/0295* (2013.01);

(Continued)

(58) Field of Classification Search

CPC ...... G01J 1/0214; G01J 1/0266; G01J 1/0271; G01J 1/0295; G01J 1/0407; G01J 1/0488;

(Continued)

(56) References Cited

U.S. PATENT DOCUMENTS 5,661,303 A * 8/1997 Teder ...................... G01N 21/43 250/341.8
5,898,183 A * 4/1999 Teder .................... B60S 1/0822 250/341.8

(Continued)

FOREIGN PATENT DOCUMENTS

WO WO 2012/175631 A2 12/2001

OTHER PUBLICATIONS

Extended European Search Report for European Application No. 25154637.0 dated May 30, 2025.

*Primary Examiner* — Isiaka O Akanbi
(74) *Attorney, Agent, or Firm* — Alston & Bird LLP

(57) ABSTRACT

Various embodiments are directed to an optical sensor configured to transmit and receive optical radiation while minimizing optical noise, such as crosstalk. An example optical sensor includes an optical radiation source configured to direct optical radiation at a target object, an optical radiation receiver configured to receive reflected optical radiation off the target object, and a housing cap. The housing cap includes a transmission opening having a lower portion and an upper portion positioned to direct optical radiation toward the target object, and a receiving opening positioned to received reflected optical radiation. A first portion of the upper portion of the transmission opening includes a vertical surface that is substantially parallel to an optical transmission axis. A second portion of the upper portion of the transmission opening comprises an angled surface, progressing into the transmission opening from an outer surface of the housing cap at a transmission opening angle.

19 Claims, 11 Drawing Sheets

(51) Int. Cl.
*G01S 17/08* (2006.01)
*G01J 1/04* (2006.01)

(52) U.S. Cl.
CPC ............. *G01S 17/08* (2013.01); *G01J 1/0407* (2013.01); *G01J 1/0488* (2013.01); *G01J 1/16* (2013.01)

(58) Field of Classification Search
CPC .......... G01J 1/16; G01S 17/08; G01S 7/4813; G01S 17/04
USPC ........... 356/335–343, 225, 4.01; 250/227.25, 250/573–574, 226, 216
See application file for complete search history.

(56) References Cited

U.S. PATENT DOCUMENTS

| | | | | |
|---|---|---|---|---|
| 6,232,603 | B1 * | 5/2001 | Nelson | G06V 20/56 250/341.8 |
| 2002/0033459 | A1 * | 3/2002 | Graves | B60S 1/0837 250/573 |
| 2007/0034785 | A1 * | 2/2007 | Yoshigoe | G01N 21/552 250/227.25 |
| 2008/0116379 | A1 * | 5/2008 | Teder | B60S 1/0822 250/221 |
| 2008/0297803 | A1 * | 12/2008 | Backes | B60S 1/0822 356/445 |
| 2009/0032689 | A1 * | 2/2009 | Backes | B60S 1/0837 250/227.24 |
| 2015/0041630 | A1 * | 2/2015 | Heng | G01J 3/50 250/216 |
| 2016/0146938 | A1 * | 5/2016 | Becker | G01S 7/4816 250/208.2 |
| 2017/0182978 | A1 * | 6/2017 | Backes | G02B 19/0014 |
| 2019/0170874 | A1 * | 6/2019 | Hung | G01J 1/4204 |
| 2020/0035851 | A1 | 1/2020 | Tsai et al. | |
| 2020/0049551 | A1 * | 2/2020 | Horan | G02B 3/08 |
| 2020/0116829 | A1 * | 4/2020 | Becker | G01S 7/4813 |
| 2020/0350455 | A1 * | 11/2020 | Gopal Krishnan | H10F 39/806 |
| 2022/0291344 | A1 | 9/2022 | Wakabayashi et al. | |
| 2024/0310492 | A1 * | 9/2024 | Wülker | G01S 7/4865 |
| 2025/0076465 | A1 * | 3/2025 | Nguyen | G01S 17/08 |

* cited by examiner

MODULE PACKAGING ARCHITECTURE TO REDUCE CROSSTALK IN AN OPTICAL SENSOR

TECHNOLOGICAL FIELD

Embodiments of the present disclosure relate generally to module packaging for optical sensors, and more particularly, to module packaging architecture to reduce crosstalk in optical sensors.

BACKGROUND

Various example embodiments address technical problems associated with optical noise from unwanted sources in an optical sensor, for example, an optical ranging, proximity, or image sensor. During operation of an optical ranging sensor, light may be received from various sources, including reflections off the target object, reflections off various surfaces of the optical ranging sensor and its external cover, and/or light from ambient sources. Light from unwanted sources, increases the noise received at the optical radiation receiver and reduces the signal-to-noise ratio (SNR) of the reflections off the target object. The increased noise may lead to inaccurate and/or inconsistent readings from an optical ranging sensor.

Applicant has identified many technical challenges and difficulties associated with reducing the optical noise received at an optical radiation receiver of an optical sensor. Through applied effort, ingenuity, and innovation, Applicant has solved problems related to the receipt of optical noise in an optical ranging sensor by developing solutions embodied in the present disclosure, which are described in detail below.

BRIEF SUMMARY

Various embodiments are directed to an optical sensor and an electronic system for transmitting and receiving reflected optical radiation while minimizing optical noise, such as crosstalk. An example optical sensor is provided. In some embodiments, the example optical sensor comprises an optical radiation source configured to generate optical radiation directed at a target object and an optical radiation receiver configured to receive reflected optical radiation reflected off the target object. The example optical sensor further comprises a housing cap, the housing cap comprising a transmission opening comprising a lower portion proximate the optical radiation source and an upper portion proximate a top surface of the housing cap and a receiving opening positioned proximate the optical radiation receiver. The transmission opening is configured such that a portion of the optical radiation passes through the transmission opening toward the target object. In addition, at least a first portion of the upper portion of the transmission opening comprises a transmission opening upper portion vertical surface, wherein the transmission opening upper portion vertical surface is substantially parallel to an optical transmission axis. Further, at least a second portion of the upper portion of the transmission opening comprises an upper portion angled surface, wherein the upper portion angled surface progresses into the transmission opening from an outer surface of the housing cap at a transmission opening angle. The receiving opening is configured such that a portion of reflected optical radiation passes through the receiving opening.

In some embodiments, the lower portion of the transmission opening comprises a lower portion vertical surface, wherein the lower portion vertical surface is substantially parallel to the optical transmission axis.

In some embodiments, the upper portion of the transmission opening comprises a receiver-side region proximate the optical radiation receiver, wherein the transmission opening upper portion vertical surface is disposed within the receiver-side region of the transmission opening.

In some embodiments, the lower portion comprises a transmission opening lower portion angled surface, wherein the transmission opening lower portion angled surface commences at an intersection of the lower portion of the transmission opening and the upper portion of the transmission opening and follows a lower portion angled surface angle away from the optical transmission axis.

In some embodiments, the lower portion of the transmission opening comprises a distant region opposite the transmission opening of the receiver-side region, wherein the transmission opening lower portion angled surface is disposed within the distant region of the transmission opening.

In some embodiments, the lower portion angled surface angle is between 10 degrees and 20 degrees.

In some embodiments, the transmission opening is symmetric about a transmitter-receiver axis, wherein the transmitter-receiver axis intersects a center of the transmission opening and a center of the receiving opening.

In some embodiments, the transmission opening is non-symmetric about a lateral axis, wherein the lateral axis is perpendicular to the transmitter-receiver axis, and wherein the lateral axis bisects the transmission opening.

In some embodiments, the transmission opening comprises a quadrilateral shape.

In some embodiments, the receiver-side region of the transmission opening comprises a receiver-region side.

In some embodiments, the transmission opening upper portion vertical surface is disposed on the receiver-region side of the transmission opening.

In some embodiments, the distant region of the transmission opening comprises a distant-region side, opposite the receiver-region side.

In some embodiments, the transmission opening lower portion angled surface is disposed on the distant-region side of the transmission opening.

In some embodiments, the receiving opening comprises a lower portion proximate the optical radiation receiver and an upper portion proximate the top surface of the housing cap, wherein at least a first portion of the upper portion of the receiving opening comprises a receiving opening upper portion vertical surface, wherein the receiving opening upper portion vertical surface is substantially parallel to an optical receiving axis.

In some embodiments, at least a second portion of the upper portion of the receiving opening comprises an angled surface, wherein the angled surface progresses into the receiving opening from the outer surface of the housing cap at a receiving opening angle.

In some embodiments, the receiving opening angle is between 25 degrees and 35 degrees.

An example electronic system configured to determine a proximity of a target object is further provided. In some embodiments, the example electronic system comprises an external cover and an optical sensor disposed in an internal compartment defined by the external cover. The optical sensor may comprise an optical radiation source configured to generate optical radiation directed at a target object, an optical radiation receiver configured to receive reflected optical radiation reflected off the target object, and a housing cap. The housing cap further comprises a transmission opening comprising a lower portion proximate the optical radiation source and an upper portion proximate a top surface of the housing cap, wherein a portion of the optical radiation passes through the transmission opening toward the target object, wherein at least a first portion of the upper portion of the transmission opening comprises a transmission opening upper portion vertical surface, wherein the transmission opening upper portion vertical surface is substantially parallel to an optical transmission axis, and wherein at least a second portion of the upper portion of the transmission opening comprises an angled surface, wherein the angled surface progresses into the transmission opening from an outer surface of the housing cap at a transmission opening angle. The housing cap further comprises a receiving opening positioned proximate the optical radiation receiver, wherein a portion of reflected optical radiation passes through the receiving opening.

In some embodiments, the lower portion comprises a transmission opening lower portion angled surface, wherein the transmission opening lower portion angled surface commences at an intersection of the lower portion of the transmission opening and the upper portion of the transmission opening and follows a lower portion angled surface angle away from the optical transmission axis.

In some embodiments, the lower portion of the transmission opening comprises a distant region opposite the transmission opening of the receiving opening, wherein the transmission opening lower portion angled surface is disposed within the distant region of the transmission opening.

In some embodiments, the lower portion angled surface angle is between 10 degrees and 20 degrees.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
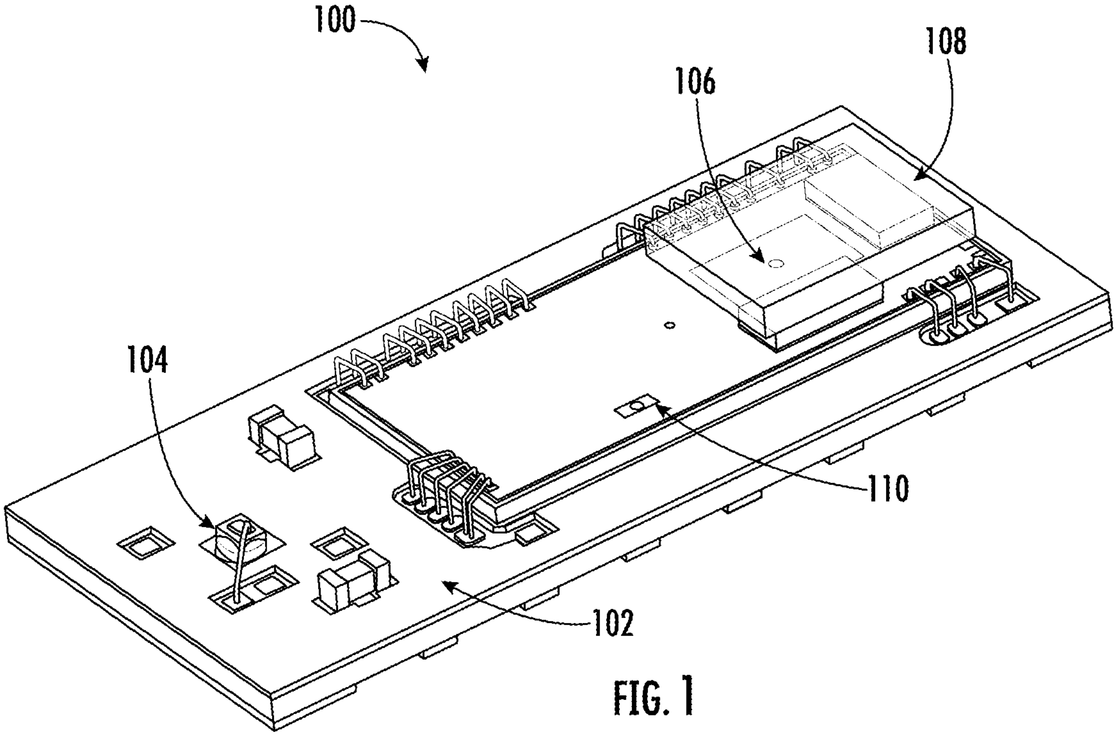
FIG. 1 illustrates a perspective view of an example optical sensor circuit board comprising an optical radiation source and an optical radiation receiver in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with receiving optical noise at an optical radiation receiver of an optical sensor (e.g., optical ranging sensor, optical proximity sensor, optical image sensor, etc.). As understood by those of skill in the field to which the present disclosure pertains, there are numerous example scenarios in which the accuracy and consistency of an optical sensor may be improved by reducing the amount of unwanted optical noise received at the optical radiation receiver.

During operation of an optical sensor, optical radiation is transmitted by an optical radiation source. The optical radiation may be directed through one or more transmitting optical structures, display screens, cover glass, and/or lens, and/or shaped by a diffractive, refractive, or metasurface element, toward a target object. A portion of the optical radiation may be reflected by the target object and may be received by an optical radiation receiver. The received reflected optical radiation may be correlated with the transmitted optical radiation to determine certain characteristics related to the proximity of the target object, for example, the distance of the target object, position of the target object, motion of the target object, and/or the speed of the target object.

In addition to the optical radiation reflected off the target object, optical radiation may be received from various unwanted sources. Optical radiation received from unwanted sources, or optical noise, may diminish the reflected optical radiation from the target object. For example, optical radiation from unwanted sources, such as but not limited to reflections off various surfaces of the optical sensor, and/or external cover, increases the noise received at the optical radiation receiver. An increase in unwanted optical noise equates to a reduction in the signal-to-noise ratio (SNR) of the reflected optical radiation reflected off the target object. As the SNR is reduced due to unwanted optical noise, the output from the optical sensor becomes increasingly inaccurate and inconsistent. Further, as the wide-angle emission of optical radiation from transmission apertures and the field of view of optical radiation receivers on optical sensors increase, the unwanted optical noise, particularly from crosstalk, also increases.

Reducing noise from unwanted crosstalk may be further complicated by system integration requirements. For example, many electronic systems may have strict size requirements, such that an optical sensor may be placed within an electronic device, or under an external cover. Such system integration requirements prevent solutions that increase the size of the optical module housing, such as adding traditional baffles to the transmission or receiving openings.

In some examples, mitigating the receipt of unwanted optical noise has included selection of housing materials and positioning of reflective surfaces. For example, an optical ranging sensor manufacturer may select materials to absorb one or more wavelengths of light. However, such materials often have material limitations with respect to the necessary characteristics of a housing cap. In addition, an optical ranging sensor manufacturer may select materials and/or a surface that randomly diffuses any incident light. Such an option may randomly reflect light towards the optical radiation receiver, increasing crosstalk optical radiation, among other things.

The various example embodiments described herein utilize various crosstalk reducing features of the housing cap to reduce unwanted optical noise received at the optical radiation receiver of an optical sensor. For example, in some embodiments, a transmission opening upper portion vertical surface is disposed on the upper portion of an optical transmission opening. Disposing the transmission opening upper portion vertical surface on the receiver-side region of the transmission opening may prevent optical radiation transmitted by the optical radiation transceiver from reflecting off various surfaces of the optical sensor, towards the optical radiation receiver.

In addition, in some embodiments, a lower portion of the transmission opening may include a transmission opening lower portion angled surface. A transmission opening lower portion angled surface may be positioned at a distant region on the side of the transmission opening opposite the receiver-side region. By selecting a lower portion angled surface angle directing the surface of the transmission opening lower portion angled surface away from the optical transmission axis, optical radiation reflecting off the inner surface of the transmission opening toward the optical radiation receiver may be reduced.

Further, in some embodiments, one or more crosstalk reducing features may be disposed on the receiving opening of the optical sensor. For examples, a receiving opening upper portion vertical surface may be disposed on an upper portion of the receiving opening of the optical sensor. Placing the receiving opening upper portion vertical surface on the transmission opening side of the receiving opening may reduce the amount of optical noise entering the receiving opening due to crosstalk optical radiation.

By utilizing crosstalk reducing features on one or more surfaces of the transmission opening and/or receiving opening of a housing cap of an optical sensor, the amount of unwanted optical noise received at the optical radiation receiver may be drastically reduced. Reduction in the unwanted optical noise at the optical radiation receiver may improve the performance and overall consistency of the optical sensor. As a result of the herein described example embodiments and in some examples, the effectiveness of optical ranging sensors, optical proximity sensors, optical image sensors, and other optical sensors may be greatly improved.

Referring now to FIG. 1, an example optical sensor circuit board 100 is provided. As depicted in FIG. 1, the example optical sensor circuit board 100 includes an optical radiation source 104, an optical radiation reference sensor 110, and an optical radiation receiver 106, each electrically connected to a substrate 102. In addition, a receiving optical structure 108 is disposed above the receiving optical structure 108.

As depicted in FIG. 1, the example optical sensor circuit board 100 includes an optical radiation source 104. An optical radiation source 104 is any device, bulb, semiconductor, diode, laser, or other photon-emitting structure configured to generate optical radiation. An optical radiation source 104 may comprise any light source, such as a laser diode, a light-emitting diode, bulb, semiconductor device, or other photon-emitting structure. In some embodiments, an optical radiation source 104 may comprise a semiconductor laser diode, for example, a vertical cavity surface emitting laser (VCSEL) and/or an edge emitting laser diode. In general, an optical radiation source 104 may output a coherent light beam upon receipt of a current. In an optical ranging sensor, the proximity of target objects in an environment may be measured by generating pulsed or continuous wave optical radiation, receiving the reflected pulsed or continuous wave optical radiation, and determining the time-of-flight of the pulsed or continuous wave optical radiation. The proximity of target objects may include the distance of the target object from the optical sensor, the position of the target object, the speed of the target object, the direction of motion of the target object, and other similar characteristics related to the position of the target object in an environment.

As further depicted in FIG. 1, the example optical sensor circuit board 100 includes an optical radiation receiver 106. An optical radiation receiver 106 may be any set of one or more photodiodes, integrated circuits, devices, sensors, light sensing diodes, or other structures that produce an electric signal as a result of light received at the optical radiation receiver 106. For example, the electric signal output by the optical radiation receiver 106 may increase as the number of photons that strike the optical radiation receiver 106 per second increases. In such an embodiment, the electric current output from the optical radiation receiver 106 may be used to determine the intensity or amplitude of the optical radiation striking the optical radiation receiver 106. In some embodiments, the optical radiation receiver 106 may be a light sensitive semiconductor diode that creates an electron-hole pair at the p-n junction when a photon of sufficient energy strikes the optical radiation receiver 106.

As depicted in FIG. 1, the optical radiation receiver 106 is electrically connected to the substrate 102. In some embodiments, the optical radiation receiver 106 may be further electrically connected to a processing device. The processing device may be configured to receive the electrical signal generated by the optical radiation receiver 106 representing the intensity or other properties of optical radiation received at the optical radiation receiver 106. In some embodiments, the processing device may determine a time-of-flight of the optical radiation transmitted by the optical radiation source 104 based on the electrical signal received by the optical radiation receiver 106 and determine one or more characteristics related to the physical position of the target object. The reception of crosstalk optical noise at the optical radiation receiver 106 may diminish the accuracy of an optical sensor.

Figure 2:
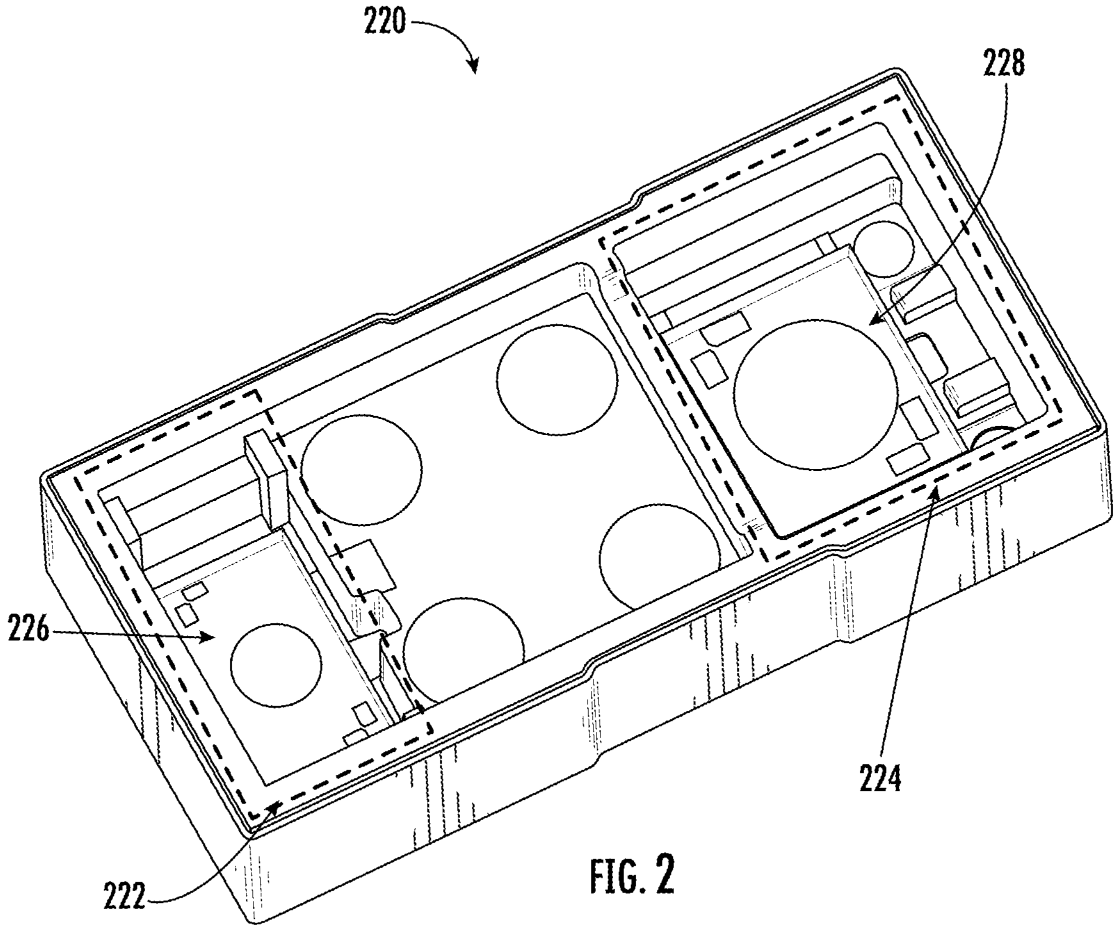
FIG. 2 illustrates a perspective view of an example housing cap for an optical sensor in accordance with an example embodiment of the present disclosure.

As further depicted in FIG. 1, the optical sensor circuit board 100 includes a substrate 102. The substrate 102 is any structure configured to support the attachment of the components of the optical sensor circuit board 100, including the housing cap (as depicted in FIG. 2). In some embodiments, the substrate 102 may comprise a printed circuit board (PCB) or ceramic alumina including electrical connections connecting the components of the optical sensor circuit board 100 to a processor, controller, analog-to-digital converter, or other electrical components.

As further depicted in FIG. 1, the optical radiation received at the optical radiation receiver 106 is configured to pass through a receiving optical structure 108. A receiving optical structure 108 is any transparent and/or semi-transparent device configured to enable the passage of optical radiation to the optical radiation receiver 106. In some embodiments, the receiving optical structure 108 may comprise an optical lens, assembly of optical lenses, or other optical device configured to distort the optical radiation, filter certain wavelengths of the optical radiation, or otherwise alter or direct the received optical radiation. The receiving optical structure 108 may create an image of the target object using the received radiation. In some embodiments, the receiving optical structure 108 may be a transparent device positioned to prevent dust, dirt, and other impurities from entering the internal cavity of the optical sensor. In some embodiments, the receiving optical structure 108 may be a band pass filter to prevent noise of an unwanted wavelength from reaching the optical radiation receiver 106. In some embodiments, the receiving optical structure 108 may comprise metasurfaces and other metasurface-type optics and/or diffractive optics. Such metasurfaces may enable optical operations such as waveform shaping, polarization transformations, optical holography generation, and so on. In some embodiments, the receiving optical structure 108 may be positioned on the external surface of the housing cap.

As further depicted in FIG. 1, the optical sensor circuit board 100 includes an optical radiation reference sensor 110. An optical radiation reference sensor 110 is any light-sensitive sensor configured to produce a reference signal for comparison to the electrical signal produced by the optical radiation receiver 106. By comparing the reference signal with the electrical signal produced by the optical radiation receiver 106, more accurate measurements of the reflected optical radiation may be determined.

Referring now to FIG. 2, an example housing cap 220 for an example optical sensor is provided. As depicted in FIG. 2, the example housing cap 220 includes a transmission region 222 comprising a transmission filter 226. The transmission region 222 is designed to align with an optical radiation source (e.g., optical radiation source 104 as depicted in FIG. 1). As further depicted in FIG. 2, the example housing cap 220 includes a receiving region 224 comprising a receiving filter 228. The receiving filter 228 is designed to align with an optical radiation receiver (e.g., optical radiation receiver 106 as depicted in FIG. 1).

A housing cap 220 may be any package, cover, container, or other covering configured to protect the internal electrical components and circuitry of the optical sensor circuit board 100. A housing cap 220 may comprise plastic, ceramic, or other protective material. The housing cap 220 is attached to the substrate 102 to form an internal compartment to protect the internal electrical components of the optical sensor circuit board 100. In some embodiments, the housing cap 220 may further include conductive pins and/or conductive pads to provide an electrical connection to the internal electrical components.

As further described herein, the housing cap 220 includes a transmission opening and a receiving opening. Openings in the housing cap 220 may enable the transmission and receipt of optical radiation out of the optical radiation source 104 and into the optical radiation receiver 106. The transmission opening and receiving opening are further described in relation to FIG. 3.

As further depicted in FIG. 2, the example housing cap 220 includes a transmission filter 226 and a receiving filter 228. A transmission filter 226 and a receiving filter 228 are any devices that selectively transmit, reflect, or block light of different wavelengths. Such optical filters may comprise glass, plastic, or another similar transparent material. Optical filters may further comprise dyes or coatings to reflect, transmit, or absorb incoming light depending on the wavelength.

Figure 3:
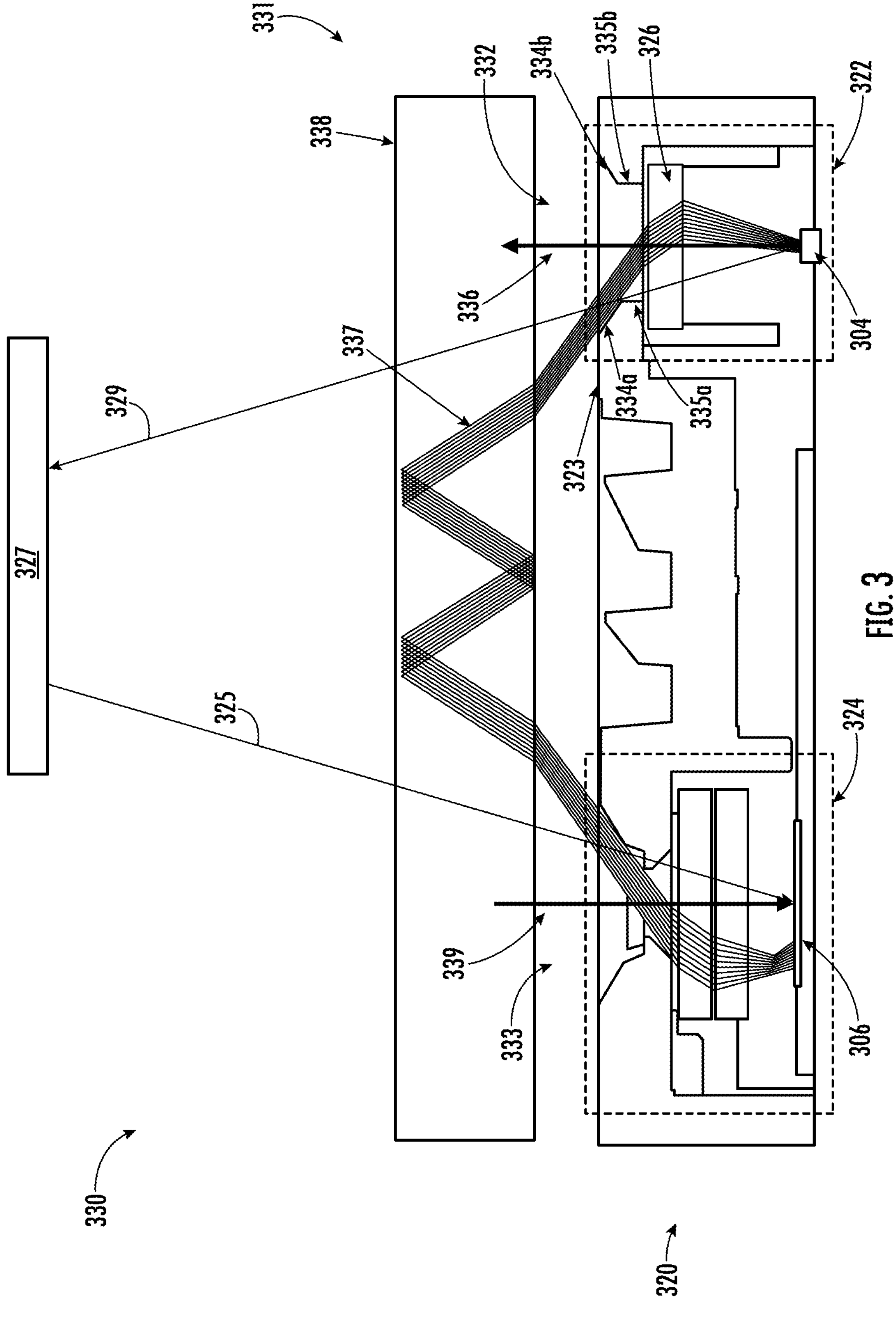
FIG. 3 illustrates an example crosstalk radiation diagram within an example cross-section view of an example optical sensor module without crosstalk reducing features.

Referring now to FIG. 3, an example crosstalk radiation diagram 330 is provided. As depicted in FIG. 3, the example crosstalk radiation diagram 330 includes an optical sensing system 331 (e.g., electronic system) comprising a housing cap 320 with a transmission region 322 and a receiving region 324. Optical radiation 329 is transmitted from an optical radiation source 304 within the transmission region 322 through a transmission opening 332 primarily along an optical transmission axis 336 and directed at a target object 327. A portion of the optical radiation 329 is reflected off the target object 327 as reflected optical radiation 325 and received through the receiving opening 333 at the optical radiation receiver 306 within the receiving region 324 of the housing cap 320 primarily along the optical receiving axis 339. The reflected optical radiation 325 may be used to determine characteristics of the target object 327, such as the size of the target object 327, the position of the target object 327, the proximity of the target object 327, the speed of the target object 327, the physical makeup of the target object 327, and so on.

A portion of the optical radiation 329 reflects, refracts, or is otherwise altered by various structures of the optical sensing system 331 and passes to the optical radiation receiver 306 as crosstalk optical radiation 337 without reflecting off the target object 327. For example, the optical path of the optical radiation may be altered by the lower portion 335*a*, 335*b* of the transmission opening 332, the upper portion 334*a*, 334*b* of the transmission opening 332, the transmission filter 326, the external cover 338, and so on. Reception of crosstalk optical radiation 337 at the optical radiation receiver 306 may have adverse effects on the determination of characteristics of the target object 327.

As depicted in FIG. 3, the optical radiation source 304 of the optical sensing system 331 is configured to generate optical radiation 329 primarily along an optical transmission axis 336. The optical radiation 329 may be any optical signal transmitted by the optical sensing system 331 toward a target object 327 to determine characteristics related to of the target object 327. In some embodiments, the optical radiation 329 may be a pulsed laser signal. For example, the optical radiation source 304 may be configured to generate uniform laser pulses. Utilizing a pulsed laser signal may enable a controller to determine the time of flight of the optical radiation 329 once the reflected optical radiation 325 is received at the optical radiation receiver 306. In some embodiments, the optical radiation 329 may be a continuous wave laser signal. In such embodiments, the continuous wave laser signal may enable a controller to determine proximity of a target object 327 by correlating the proximity of the target object 327 with the phase change in the optical radiation 329 as it is emitted by the optical radiation source 304, reflected off the target object 327, and subsequently received by the optical radiation receiver 306.

As further depicted in FIG. 3, the optical radiation 329 is primarily emitted along an optical transmission axis 336. The optical transmission axis 336 is any ray normal to the transmission surface of the optical radiation source 304 and passing from the transmission surface of the optical radiation source 304 through the transmission opening 332.

As further depicted in FIG. 3, the optical radiation 329 is directed at a target object 327. A target object 327 may be any object, structure, person, entity, or other item positioned in the line-of-sight of the optical radiation 329 transmitted by the optical sensing system 331. In some embodiments, the optical sensing system 331 may be configured to determine one or more proximity characteristics of the target object 327, such as the spatial position, composition, proximity, motion, and/or speed of the target object 327. For example, in some embodiments, the optical sensing system 331 may be positioned under the electronic display screen of a mobile device (e.g., external cover 338) and may be configured to detect a target object 327 within a pre-determined threshold distance of the optical sensing system 331. In an instance in which a target object 327 is within the pre-determined threshold distance of the optical sensing system 331, the mobile device may deactivate the touch screen, turn off the display, or take any other relevant action.

As further depicted in FIG. 3, a certain portion of the optical radiation 329 may reflect off the target object 327 as reflected optical radiation 325. Reflected optical radiation 325 is any optical radiation 329 transmitted by the optical radiation source 304 of the optical sensing system 331, reflected off the target object 327, and received by the optical radiation receiver 306 of the optical sensing system 331. The reflected optical radiation 325 is primarily received by the optical radiation receiver 306 along an optical receiving axis 339. The optical receiving axis 339 is any ray passing through the receiving opening 333 of the housing cap 320 and is normal to the receiving surface of the optical radiation receiver 306.

As further depicted in FIG. 3, the optical sensing system 331 includes an external cover 338, such as a display screen. The external cover 338 is any transparent and/or semi-transparent device positioned external to the housing cap 320 through which the optical radiation 329 and reflected optical radiation 325 pass before and after encountering the target object 327.

In some embodiments, the external cover 338 may be the electronic display screen of an electronic device, such as a mobile phone. In such an embodiment, the optical sensor transmits and receives optical radiation 329 through the electronic display screen to determine proximity characteristics of a target object 327 external to the mobile device. An electronic display screen may be transparent or semi-transparent to certain wavelengths of light, such that reflected optical radiation 325 may be received by the optical radiation receiver 306 behind or under the electronic display screen.

In some embodiments, the external cover 338 may be a protective cover separating the internal components of the optical sensing system 331 from external elements. In such an embodiment, the optical ranging sensor 302 transmits and receives optical radiation 329 through the external cover 338 to determine characteristics of a target object 327 external to the mobile device. An external cover 338 may protect the internal components of the optical sensing system 331 from foreign materials such as, but not limited to, dust, water, and oil.

As further depicted in FIG. 3, the housing cap 320 of the optical sensing system 331 includes a transmission opening 332. A transmission opening 332 is any hole, slit, aperture, or other opening aligned with the optical radiation source 304 to facilitate the transmission of optical radiation 329 toward a target object 327. A transmission opening 332 may include optical features such as lenses, structures, beam shaping elements or light diffusers, metasurfaces, or other features to direct the optical radiation 329 toward a target object 327 and/or various portions of a target object 327.

As depicted in FIG. 3, the transmission opening 332 includes a lower portion 335*a*, 335*b* (e.g., lower portion vertical surface). The lower portion 335*a*, 335*b* of the transmission opening 332 is the portion of the transmission opening 332 proximate, or closer to, the optical radiation source 304. As depicted in FIG. 3, the lower portion 335*a*, 335*b* of the transmission opening 332 is vertical, or in other words, substantially parallel to the optical transmission axis 336. The lower portion 335*a*, 335*b* directs optical radiation 329 generated by the optical radiation source 304 through the transmission opening 332. As further depicted in FIG. 3, the lower portion 335*a*, 335*b* of the transmission opening 332 includes a receiver-side region lower portion 335*a* comprising the portion of the lower portion 335*a*, 335*b* proximate the receiving region 324 of the housing cap 320. The lower portion 335*a*, 335*b* of the transmission opening 332 further includes a distant region lower portion 335*b* comprising the portion of the lower portion 335*a*, 335*b* opposite the receiving region 324 of the housing cap 320.

As further depicted in FIG. 3, the transmission opening 332 includes an upper portion 334*a*, 334*b* (e.g., upper portion angled surface). The upper portion 334*a*, 334*b* of the transmission opening 332 is the portion of the transmission opening 332 proximate, or closer to, the top surface 323 (e.g., outer surface) of the housing cap 320. As depicted in FIG. 3, the upper portion 334*a*, 334*b* of the transmission opening 332 is angled, or in other words, the upper portion 334*a*, 334*b* transitions from the lower portion 335*a*, 335*b* of the transmission opening 332 to a wider opening at the top surface 323 of the housing cap 320. The wider opening provided by the upper portion 334*a*, 334*b* of the transmission opening 332 enables optical radiation 329 to be transmitted with a wider transmission angle. As further depicted in FIG. 3, the upper portion 334*a*, 334*b* of the transmission opening 332 includes a receiver-side region upper portion 334*a* comprising the portion of the upper portion 334*a*, 334*b* proximate the receiving region 324 of the housing cap 320. The upper portion 334*a*, 334*b* of the transmission opening 332 further includes a distant region upper portion 334*b* comprising the portion of the upper portion 334*a*, 334*b* opposite the receiving region 324 of the housing cap 320.

As depicted in FIG. 3, due to the wide transmission angle of the optical radiation 329, a large portion of the optical radiation 329 may be reflected, refracted, and/or otherwise directed toward the optical radiation receiver 306 without encountering the target object 327 as crosstalk optical radiation 337. Crosstalk optical radiation 337 is any optical radiation received at the optical radiation receiver 306 that was not transmitted by the optical radiation source 304, or that did not take a direct path from the optical radiation source 304 to the target object 327 and return to the optical radiation receiver 306. For example, as depicted in FIG. 3, crosstalk optical radiation 337 emanates from the optical radiation source 304 and passes through the transmission filter 326. A portion of the optical radiation 329 is refracted of the optical transmission axis 336 and directed into the external cover 338 at an incident angle such that the optical radiation is internally reflected within the external cover 338. The optical radiation is then received directly by the optical radiation receiver 306 without encountering the target object 327. The path of crosstalk optical radiation 337 shown in FIG. 3 may be a major source of optical noise at the optical radiation receiver 306. In addition, the increased transmission angle provided by the upper portion 334*a*, 334*b* of the transmission opening 332 may further exacerbate the crosstalk optical radiation 337 received at the optical radiation receiver 306.

Crosstalk optical radiation 337 received from unwanted sources of optical radiation, or from various reflections of the transmitted optical radiation 329 not associated with the target object 327 may diminish the ability of the optical sensing system 331 to detect reflected optical radiation 325 off the target object 327. An increase in crosstalk optical radiation 337 may result in a reduction in the signal-to-noise ratio (SNR) of the reflected optical radiation 325 received off the target object 327. As the SNR is reduced due to crosstalk optical radiation 337, the determined characteristics of the target object 327 may become increasingly inaccurate and inconsistent.

Figure 4:
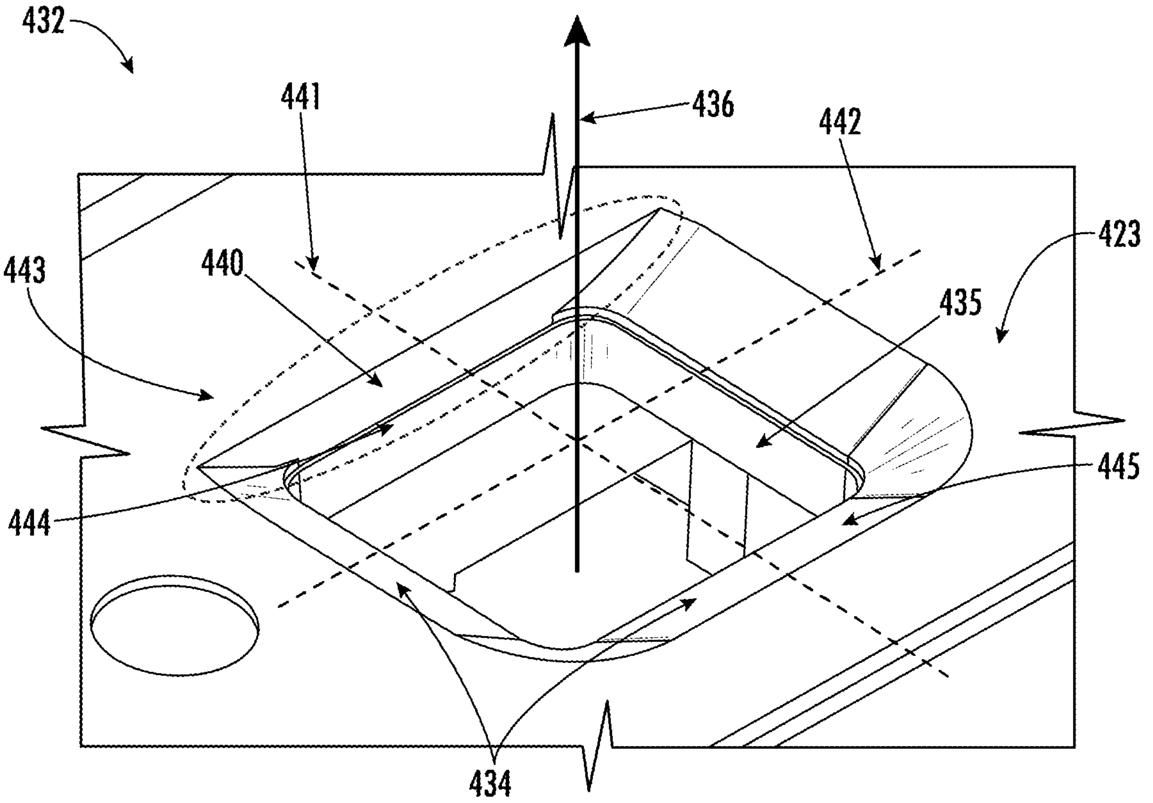
FIG. 4 illustrates a perspective view of an example transmission opening comprising an example transmission opening upper portion vertical surface in accordance with an example embodiment of the present disclosure.

Referring now to FIG. 4, an example transmission opening 432 of an optical sensing system is provided. As depicted in FIG. 4, the example transmission opening 432 comprises a lower portion 435 having a vertical surface substantially parallel to the optical transmission axis 436 of the transmitted optical radiation (e.g., lower portion vertical surface). The example transmission opening 432 further includes an upper portion 434 comprising an upper portion angled surface 445 transitioning from the lower portion 435 of the transmission opening 432 to a wider opening at the top surface 423 of the housing cap. As further depicted in FIG. 4, the upper portion vertical surface 440 comprises a portion of the upper portion 434 of the transmission opening 432 within the receiver-side region 443 and disposed on the receiver-region side 444 of the transmission opening 432.

As depicted in FIG. 4, the transmission opening 432 includes a lower portion 435 and an upper portion 434. The surfaces of the complete lower portion 435 are vertical, meaning the surfaces of the lower portion 435 are substantially parallel to the optical transmission axis 436. The verticality of the lower portion 435 direct transmitted optical radiation (e.g., optical radiation 329) through the transmission opening 432. The upper portion 434 is comprised of two primary portions, an upper portion angled surface 445 and an upper portion vertical surface 440. As described in relation to FIG. 3, the upper portion angled surface 445 transitions from the lower portion 435 to a wider opening at the top surface 423 of the housing cap, increasing the transmission angle of the optical radiation.

The upper portion vertical surface 440 comprises a portion of the upper portion 434 of the transmission opening 432. The upper portion vertical surface 440 is any portion of the upper portion 434 of the transmission opening 432 having a surface substantially parallel to the optical transmission axis 436. As depicted in FIG. 4, the upper portion vertical surface 440 is disposed within the receiver-side region 443 of the transmission opening 432. The receiver-side region 443 is any region of the transmission opening 432 proximate the receiving region (e.g., receiving region 224, 324) of the housing cap. By placing the upper portion vertical surface 440 within the receiver-side region 443 of the transmission opening 432 but leaving the rest of the upper portion 434 as an upper portion angled surface 445, a portion of the transmission of optical radiation proceeding out of the transmission opening 432 directly towards the receiving opening (e.g., receiving opening 333) may be blocked, while a wide transmission angle is maintained.

As depicted in FIG. 4, the transmission opening 432 is a quadrilateral shape comprising four sides. Although depicted as a quadrilateral shape, the transmission opening 432 may be any shape or size facilitating the transmission of optical radiation. In an instance in which the transmission opening 432 comprises two or more sides, the receiver-region side 444 may comprise the side of the transmission opening 432 closest to the receiving region of the housing cap. For example, as depicted in FIG. 4, the receiver-region side 444. By configuring a portion of the receiver-region side 444 as the upper portion vertical surface 440, a portion of the transmission of optical radiation proceeding out of the transmission opening 432 directly towards the receiving opening may be blocked, while a wide transmission angle is maintained.

As further depicted in FIG. 4, a transmitter-receiver axis 441 and a lateral axis 442 are shown. A transmitter-receiver axis 441 is any line passing through the center point of the receiving opening (e.g., receiving opening 333) and the transmission opening 432. In some embodiments, the transmission opening 432 is symmetric about the transmitter-receiver axis 441. The lateral axis 442 is any line perpendicular to the transmitter-receiver axis 441 and passing through the center point of the transmission opening 432 parallel to the top surface 423 of the housing cap. As depicted in FIG. 4, the lateral axis 442 may be perpendicular to both the transmitter-receiver axis 441 and the optical transmission axis 436. In some embodiments, the transmission opening 432 is asymmetric about the lateral axis 442. The transmission opening 432 may be asymmetric about the lateral axis 442 because the receiver-side region 443 of the transmission opening 432 may comprise the upper portion vertical surface 440 while the region opposite the receiver-side region 443 does not.

Figure 5:
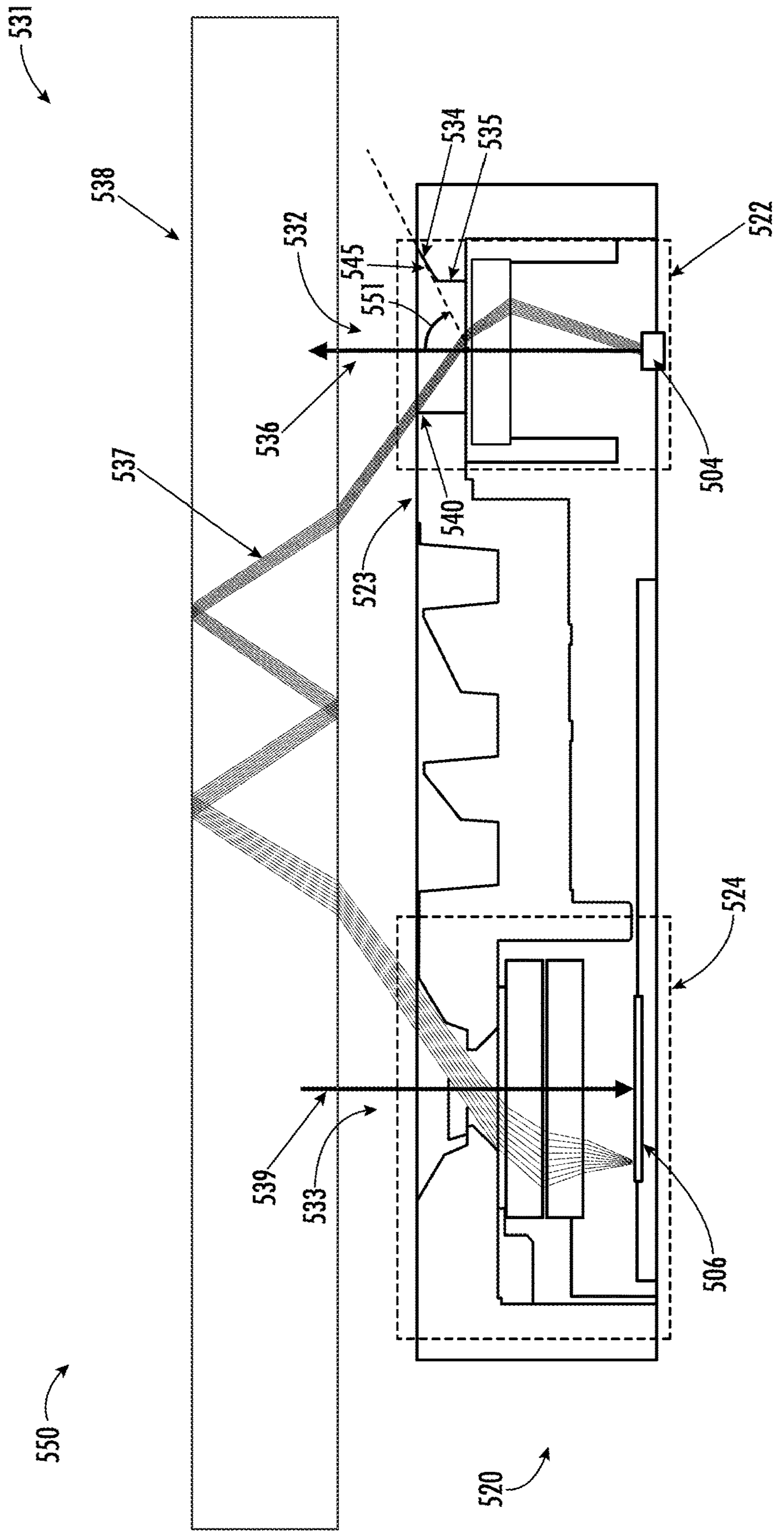
FIG. 5 illustrates an example reduced crosstalk radiation diagram within an example cross-section view of an optical sensor module comprising an example transmission opening upper portion vertical surface in accordance with an example embodiment of the present disclosure.

Referring now to FIG. 5, an example reduced crosstalk radiation diagram 550 is provided. As shown in FIG. 5, the example optical sensing system 531 comprises a housing cap 520 and an external cover 538. The housing cap 520 includes a transmission region 522 and a receiving region 524. The transmission region 522 includes an optical radiation source 504 configured to generate optical radiation directed through the transmission opening 532 of the housing cap 520 primarily along the optical transmission axis 536. As further depicted in FIG. 5, the transmission opening 532 includes a lower portion 535 having a vertical surface and an upper portion 534 comprising an upper portion angled surface 545 transitioning from the lower portion 535 to the top surface 523 at a transmission opening angle 551. In addition, the upper portion 534 proximate the receiving region 524 comprises an upper portion vertical surface 540 configured to limit the amount of crosstalk optical radiation 537 transmitted from the transmission opening 532 toward the receiving opening 533 and the optical radiation receiver 506.

As depicted in FIG. 5, a portion of the upper portion 534 of the transmission opening 532 comprises an upper portion angled surface 545. The upper portion angled surface 545 transitions from the lower portion 535 to the provide a wider transmission angle at the top surface 523 of the housing cap 520. The angle of the upper portion angled surface 545 is defined as the angle from the optical transmission axis 536, labeled as the transmission opening angle 551 in FIG. 5. The transmission opening angle 551 is between 45 and 80 degrees; more preferably between 50 and 70 degrees; most preferably between 60 and 70 degrees. The upper portion angled surface 545 enables the optical radiation to be transmitted at a wide transmission angle.

As further depicted in FIG. 5, the transmission opening 532 comprises an upper portion vertical surface 540 in the receiver-side region of the transmission opening 532. The upper portion vertical surface 540 is substantially parallel to the optical transmission axis 536 to the top surface 523 of the housing cap 520. Disposing an upper portion vertical surface 540 in the receiver-side region of the transmission opening 532 blocks at least a portion of the crosstalk optical radiation 537 from transmitting to the optical radiation receiver 506 while still enabling a wide-angle optical transmission. As compared to FIG. 3, the amount of crosstalk optical radiation 537 is significantly reduced with the addition of the upper portion vertical surface 540.

Figure 6:
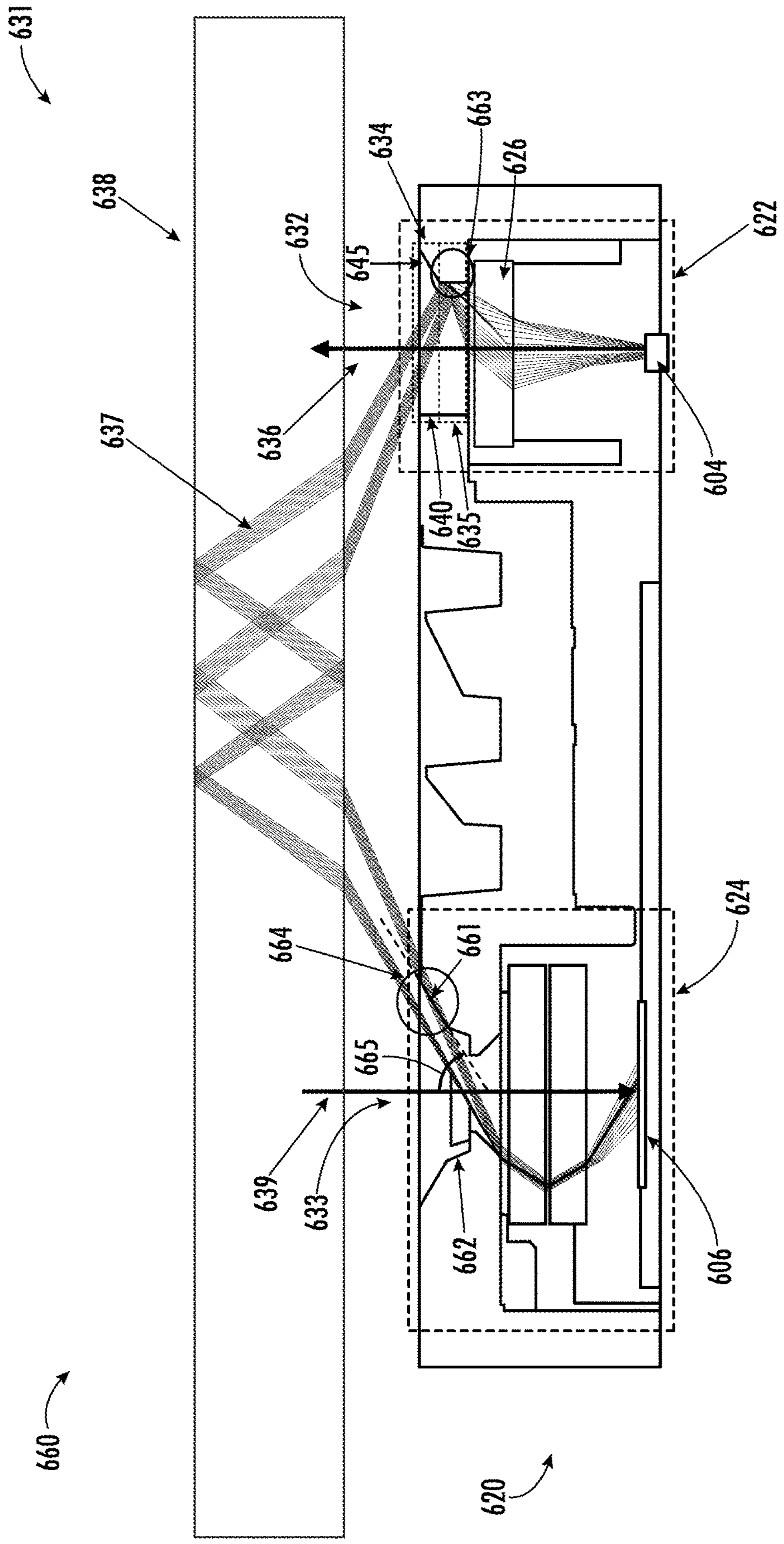
FIG. 6 illustrates an example crosstalk radiation diagram within an example cross-section view of an example optical sensor module comprising a transmission opening upper portion vertical surface in accordance with an example embodiment of the present disclosure.

Referring now to FIG. 6, an example crosstalk radiation diagram 660 is provided. As depicted in FIG. 6, the example crosstalk radiation diagram 660 includes an optical sensing system 631 (e.g., electronic system) comprising a housing cap 620 with a transmission region 622 and a receiving region 624. Optical radiation is transmitted from an optical radiation source 604 within the transmission region 622 through a transmission opening 632 primarily along an optical transmission axis 636. A portion of the optical radiation reflects, refracts, or is otherwise altered by various structures of the optical sensing system 631 and passes to the optical radiation receiver 606 as crosstalk optical radiation 637 without reflecting off the target object. For example, the optical path of the optical radiation may be altered by the lower portion 635 of the transmission opening 332, the transmission filter 626, the external cover 638, and so on. Reception of crosstalk optical radiation 637 at the optical radiation receiver 606 may have adverse effects on the operation of the optical sensing system 631.

As depicted in FIG. 6, the transmission opening 632 comprises an upper portion 634 and a lower portion 635. The upper portion 634 comprises an upper portion vertical surface 640 configured to reduce crosstalk optical radiation 637 and an upper portion angular surface 645 to maintain a wide transmission angle. In addition, the lower portion 635 includes a distant region 663 comprising a region of the lower portion 635 opposite the receiving region 624. As depicted in FIG. 6, in some embodiments, optical radiation emitted by the optical radiation source 604 may reflect off the lower portion 635 of the optical transmission opening 632 toward the receiving region 624 and be received at the optical radiation receiver 606 as crosstalk optical radiation 637.

As further depicted in FIG. 6, the receiving opening 633 comprises a lower portion 662 and an upper portion 661. The upper portion 661 transitions from the lower portion 662 at a receiving opening angle 665, such that the receiving opening 633 may receive optical radiation at a wide receiving angle. As further depicted in FIG. 6, a significant portion of crosstalk optical radiation 637 is received at the transmitter-side region 664 of the receiving opening 633. The receipt of crosstalk optical radiation 637 through the receiving opening 633 is increased due to the wide receiving angle of the receiving opening 633.

Figure 7:
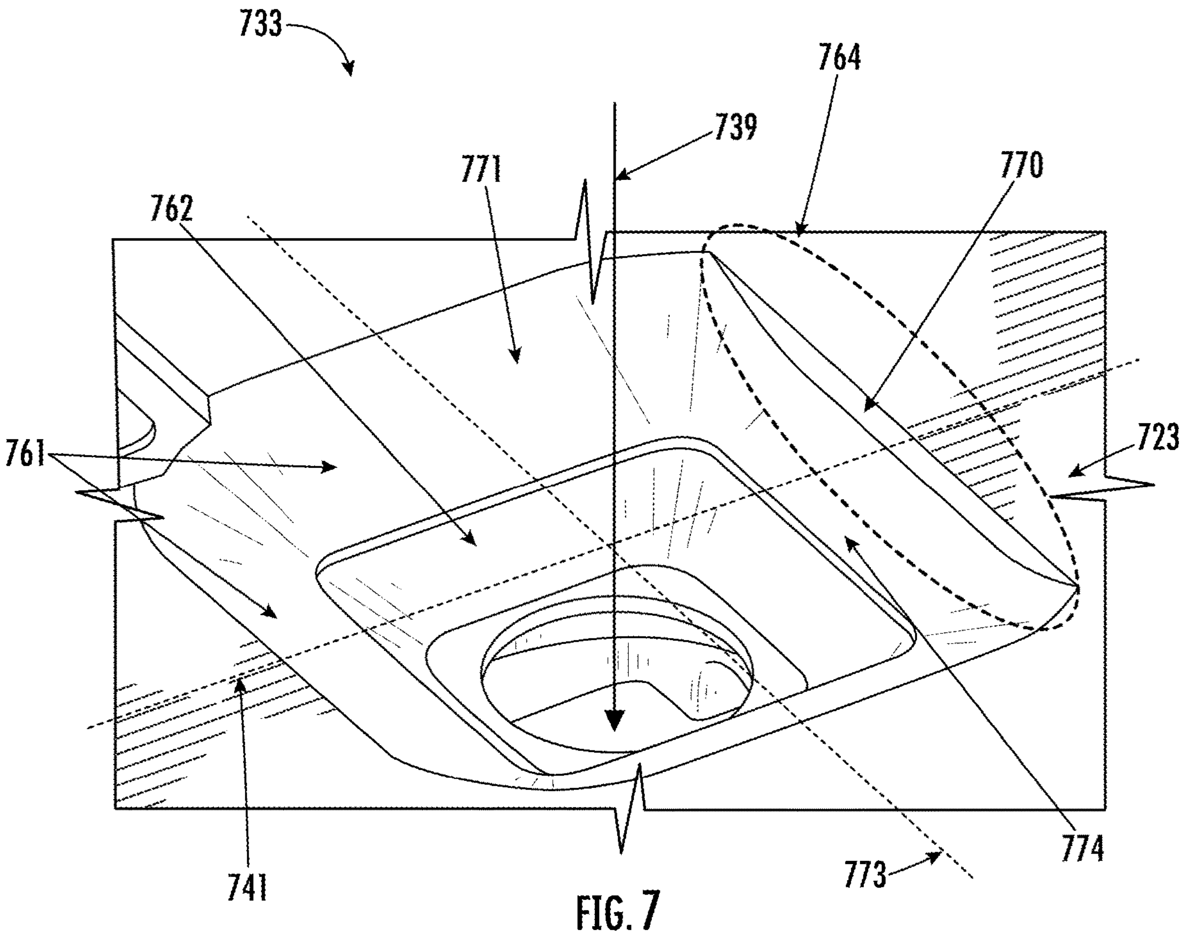
FIG. 7 illustrates a perspective view of an example receiving opening comprising an example receiving opening upper portion vertical surface in accordance with an example embodiment of the present disclosure.

Referring now to FIG. 7, an example receiving opening 733, comprising a receiving opening upper portion vertical surface 770 is provided. As depicted in FIG. 7, the example receiving opening 733 comprises a lower portion 762 comprising an angled surface and an upper portion 761 comprising an upper portion angled surface 771 and an upper portion vertical surface 770. The upper portion vertical surface 770 of the example receiving opening 733 is disposed on a portion of the upper portion 761 within the transmitter-side region 764 of the receiving opening 733.

As depicted in FIG. 7, the receiving opening comprises a lower portion 762 and an upper portion 761. Both the lower portion 762 and the upper portion 761 are angled with respect to the optical receiving axis 739. The upper portion 761 further comprises a receiving opening upper portion vertical surface 770. The receiving opening upper portion vertical surface 770 is any portion of the upper portion 761 of the receiving opening 733 having a surface substantially parallel to the optical receiving axis 739. As depicted in FIG. 7, the receiving opening upper portion vertical surface 770 is disposed within the transmitter-side region 764 of the receiving opening 733. The transmitter-side region 764 is any region of the receiving opening 733 proximate the transmission region (e.g., transmission region 222, 322, 522, 622) of the housing cap. By placing the receiving opening upper portion vertical surface 770 within the transmitter-side region 764, proximate the transmission region, a portion of the crosstalk radiation originating from the optical radiation source may be prevented from entering the receiving opening 733. In addition, utilizing an upper portion angled surface 771 over the rest of the receiving opening 733 enables the reception of optical radiation at a wide reception angle.

As depicted in FIG. 7, the receiving opening 733 is a quadrilateral shape comprising four sides. Although depicted as a quadrilateral shape, the receiving opening 733 may be any shape or size facilitating the reception of optical radiation. In an instance in which the receiving opening 733 comprises two or more sides, the transmitter-region side 774 may comprise the side of the receiving opening 733 closest to the transmission region of the housing cap. For example, as depicted in FIG. 7, the transmitter-region side 774. By configuring a portion of the upper portion 761 on the transmitter-region side 774 as the receiving opening upper portion vertical surface 770, a crosstalk optical radiation received at the receiving opening 733 may be reduced, while a wide receiving angle is maintained.

As further depicted in FIG. 7, a transmitter-receiver axis 741 and a lateral axis 773 are shown. A transmitter-receiver axis 741 is any line passing through the center point of the receiving opening 733 and the transmission opening (e.g., transmission opening 332, 432, 532, 632). In some embodiments, the receiving opening 733 is symmetric about the transmitter-receiver axis 741. The receiving opening lateral axis 773 is any line perpendicular to the transmitter-receiver axis 741 and passing through the center point of the receiving opening 733 parallel to the top surface 723 of the housing cap. As depicted in FIG. 7, the receiving opening lateral axis 773 may be perpendicular to both the transmitter-receiver axis 741 and the optical receiving axis 739. In some embodiments, the receiving opening 733 is asymmetric about the receiving opening lateral axis 773. The receiving opening 733 may be asymmetric about the lateral axis 773 because the transmitter-side region 764 of the receiving opening 733 may comprise the receiving opening upper portion vertical surface 770, while the region opposite the transmitter-side region 764 does not.

Figure 8:
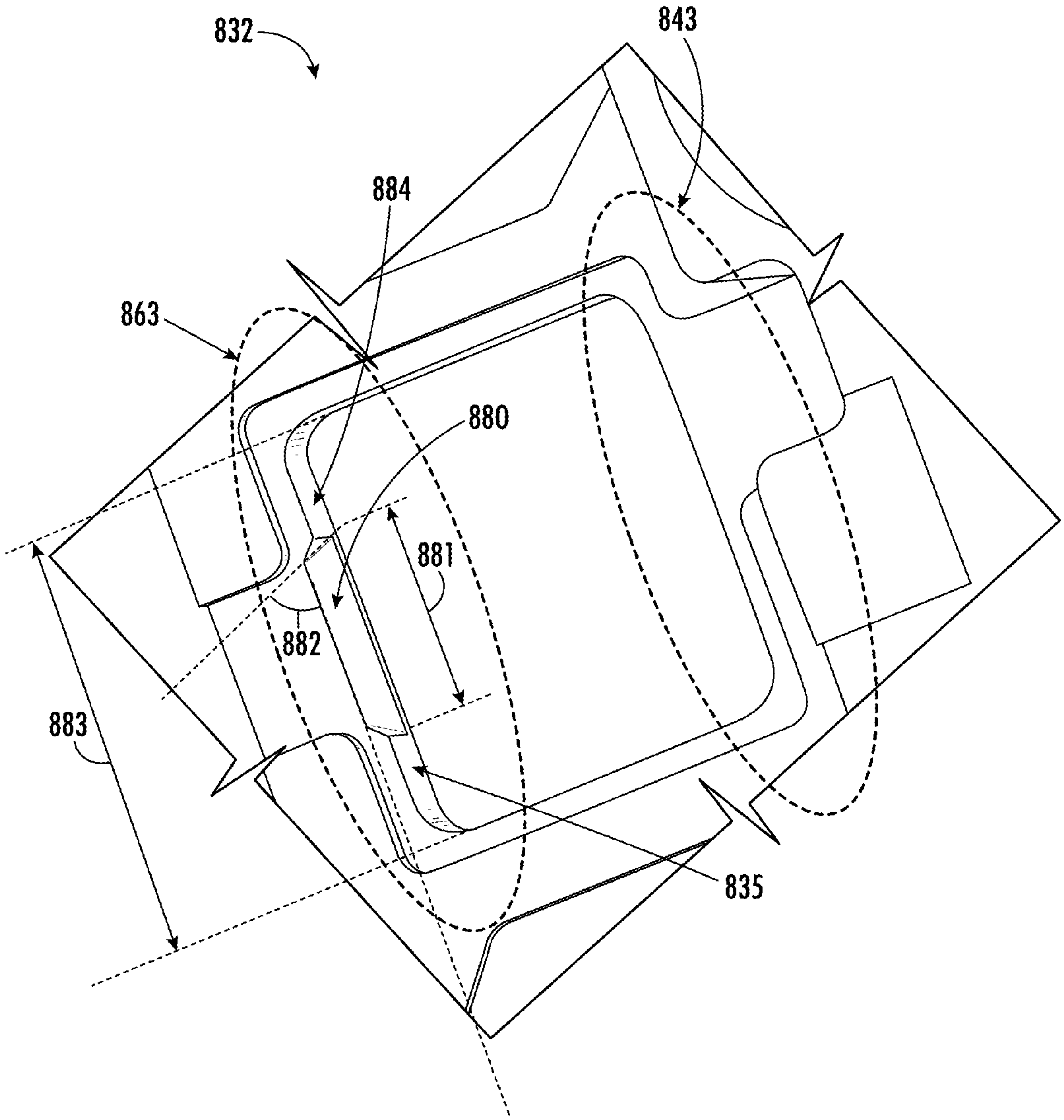
FIG. 8 illustrates a perspective view of the lower portion of an example transmission opening comprising an example transmission opening lower portion angled surface in accordance with an example embodiment of the present disclosure.

Referring now to FIG. 8, an example transmission opening 832 is provided. As depicted in FIG. 8, the example transmission opening 832 is shown from the inside of the housing cap. The example transmission opening 832 includes a transmission opening lower portion 835 comprising a lower portion angled surface 880. The lower portion angled surface 880 is disposed within the distant region 863 of the transmission opening 832, opposite the receiver-side region 843. By disposing the lower portion angled surface 880 within the distant region 863 of the transmission opening 832, the crosstalk optical radiation reflected off the transmission opening lower portion 835 toward the optical radiation receiver of the optical sensing system.

As depicted in FIG. 8, the example transmission opening 832 includes a lower portion angled surface 880. The lower portion angled surface 880 is any surface on the lower portion 835 of the transmission opening 832 positioned at a lower portion angled surface angle relative to the optical transmission axis. In some embodiments, the lower portion angled surface 880 is positioned within the distant region 863 of the transmission opening 832. The distant region 863 comprises the portion of the transmission opening 832 furthest away from the transmission region of the housing cap, or in other words, opposite the transmission opening 832 from the receiver-side region 843. Positioning the lower portion angled surface 880 within the distant region 863 reduces the optical radiation reflecting off the surface of the lower portion 835 of the transmission opening 832 toward the receiving region of the optical sensor system.

As described herein, and as shown in FIG. 8, the transmission opening 832 may be defined as a quadrilateral shape comprising four sides. As depicted in FIG. 8, the lower portion angled surface 880 may be disposed on a portion of the distant-region side 884, wherein the distant-region side 884 is the side of the quadrilateral farthest from the receiving region of the optical sensor.

As further depicted in FIG. 8, the lower portion angled surface 880 may comprise a lower portion angled surface width 881 and each side may exhibit a lower portion angled surface side angle 882. In some embodiments, the lower portion angled surface width 881 may depend on the transmission opening width 883. For example, in a particular embodiment, wherein the transmission opening width 883 is 0.08 millimeters, the lower portion angled surface width 881 may be between 0.3 and 0.46 millimeters; more preferably between 0.34 and 0.42 millimeters; most preferably between 0.36 and 0.4 millimeters. In a particular embodiment, the lower portion angled surface side angle 882 may be between 30 degrees and 60 degrees; more preferably between 35 degrees and 55 degrees; most preferably between 40 degrees and 50 degrees.

Figure 9:
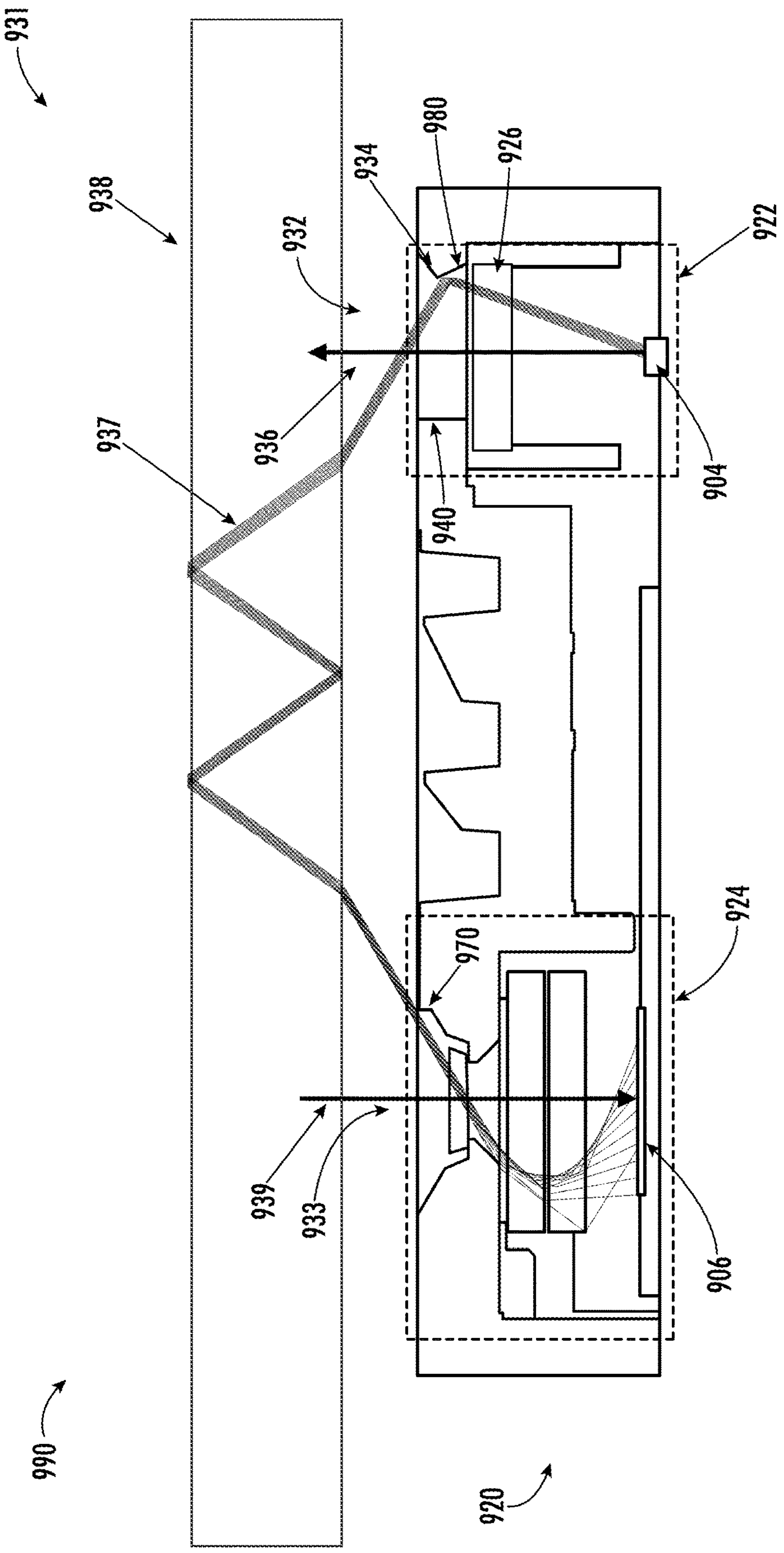
FIG. 9 illustrates an example reduced crosstalk radiation diagram within a cross-section of an example optical sensor housing cap comprising an example transmission opening upper portion vertical surface, an example transmission opening lower portion angled surface, and an example receiving opening upper portion vertical surface in accordance with an example embodiment of the present disclosure.

Referring now to FIG. 9, an example reduced crosstalk radiation diagram 990 is provided. As depicted in FIG. 9, the reduced crosstalk radiation diagram 990 illustrates the crosstalk optical radiation 937 within an optical sensing system 931 comprising multiple crosstalk reducing features, including the receiving opening upper portion vertical surface 970 disposed on the upper surface of the receiving opening 933, the upper portion vertical surface 940 disposed on the upper portion of the transmission opening 932, and the lower portion angled surface 980 disposed on the lower portion of the transmission opening 932.

As shown in FIG. 9, the example optical sensing system 931 comprises a housing cap 920 and an external cover 938. The housing cap 920 includes a transmission region 922 and a receiving region 924. The transmission region 922 includes an optical radiation source 904 configured to generate optical radiation directed through the transmission opening 932 of the housing cap 920 primarily along the optical transmission axis 936. The housing cap 920 further includes a receiving region 924 configured to receive optical radiation at an optical radiation receiver 906 passing through the receiving opening 933 primarily along the optical receiving axis 939.

A portion of the optical radiation is reflected, refracted, redirected, or otherwise altered by the various components of the optical sensing system 931, for example, the transmission filter 926, the various surfaces of the transmission opening 932 and the receiving opening 933, the external cover 938, and other components. Each of the crosstalk reducing features effectively reduces the crosstalk optical radiation 937 received at the optical radiation receiver 906. As compared to FIG. 6, the amount of crosstalk optical radiation 937 is significantly reduced with the addition of the receiving opening upper portion vertical surface 970 disposed on the upper surface of the receiving opening 933, and the lower portion angled surface 980 disposed on the lower portion of the transmission opening 932.

Figure 10:
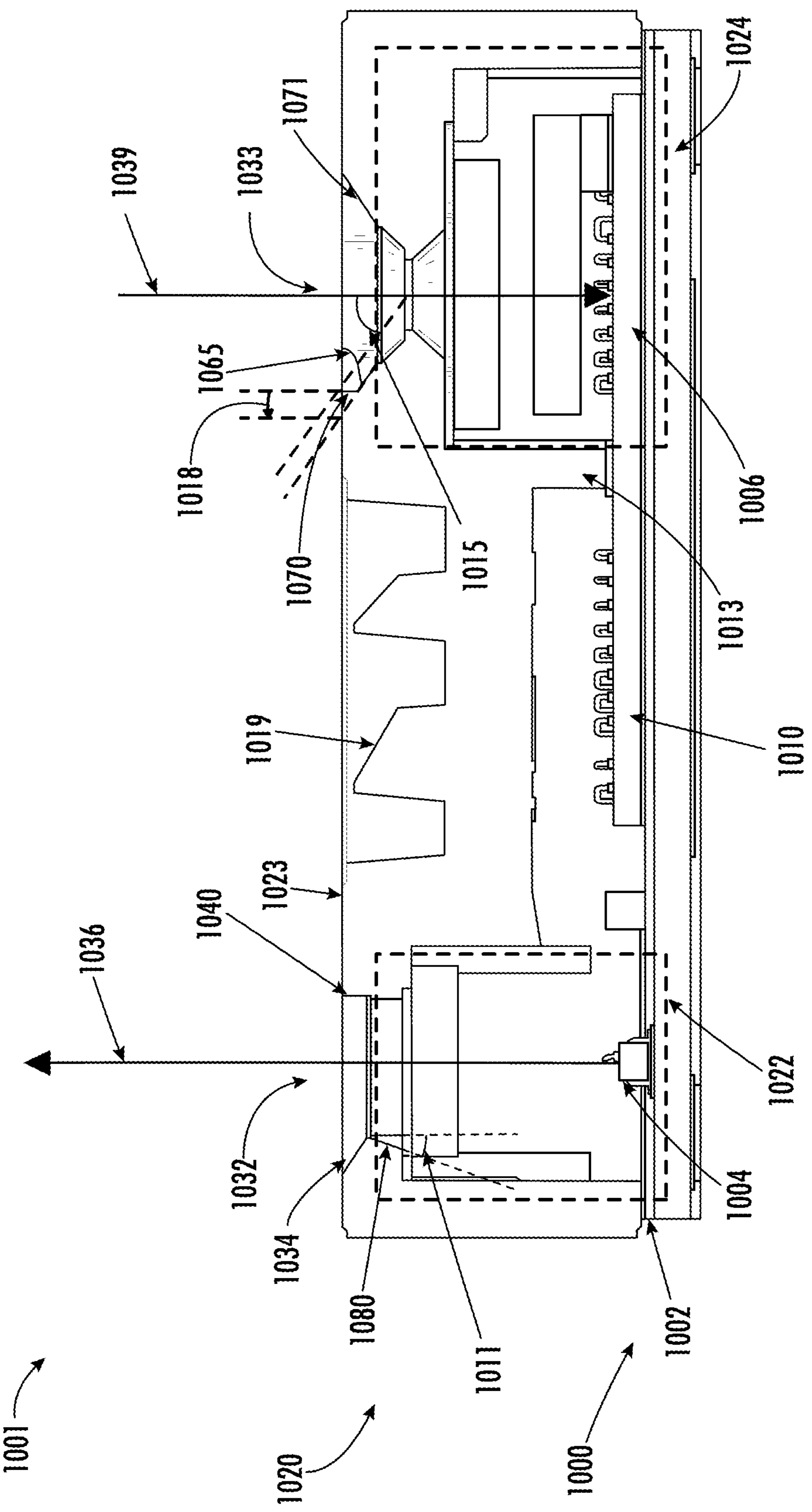
FIG. 10 illustrates a cross-section view of an example optical sensor module comprising example crosstalk reducing features in accordance with an example embodiment of the present disclosure.

Referring now to FIG. 10, an example optical sensor module 1001 is provided. As shown in FIG. 10, the example optical sensor module 1001 includes an optical sensor circuit board 1000 and a housing cap 1020. The optical sensor circuit board 1000 includes a substrate 1002 attached to the housing cap 1020 and comprising an optical radiation source 1004 configured to transmit optical radiation primarily along an optical transmission axis 1036. The optical sensor circuit board 1000 further includes an optical radiation reference sensor 1010, an optical radiation receiver 1006, and a receiving optical structure 1008.

The housing cap 1020 comprises a transmission region 1022 and a receiving region 1024. The transmission region 1022 comprises a transmission opening 1032 designed with crosstalk reducing features. For example, a transmission opening 1032 upper portion vertical surface 1040 is positioned in the receiver-side region of the transmission opening 1032 to prevent crosstalk optical radiation from transmitting to the optical radiation receiver 1006. In addition, the transmission opening 1032 includes a transmission opening 1032 lower portion angled surface 1080 positioned in the distant region, opposite the receiving region 1024, to prevent crosstalk optical radiation from reflecting off the lower portion of the transmission opening 1032. The transmission opening 1032 further includes an upper portion angled surface 1034 configured to increase the transmission angle of the emitted optical radiation.

The receiving region 1024 comprises a receiving opening 1033 including further crosstalk reducing features. For example, the receiving opening 1033 upper portion vertical surface 1070 positioned on the transmission-side region of the receiving opening 1033 to reduce crosstalk optical radiation. The receiving opening 1033 further includes an upper portion angled surface 1071 configured to increase the receiving angle of the reflected optical radiation.

As further depicted in FIG. 10, the housing cap 1020 includes additional crosstalk reducing features. For example, the housing cap 1020 includes a central barrier 1013 between the transmission region 1022 and the receiving region 1024 of the housing cap 1020. The central barrier 1013 may be any structure, feature, wall, or other barrier placed between the transmission region 1022 and the receiving region 1024 and positioned to prevent the optical radiation from passing from the optical radiation source 1004 to the optical radiation receiver 1006 through the internal cavity of the housing cap 1020.

The housing cap 1020 further includes one or more anti-crosstalk protrusions 1019 positioned on the top surface 1023 of the housing cap 1020. The anti-crosstalk protrusions 1019 are any structures, features, walls, or other projections, position on the top surface 1023 of the housing cap 1020 between the receiving opening 1033 and the transmission opening 1032 to redirect optical radiation encountering the top surface 1023 of the housing cap 1020 away from the receiving opening 1033. In some embodiments, the anti-crosstalk protrusions 1019 may include angled surfaces to reflect optical radiation away from the receiving opening 1033. In some embodiments, the angled surfaces of the anti-crosstalk protrusions 1019 may be configured to direct optical radiation past the receiving opening 1033 such that the optical radiation does not enter the receiving opening 1033.

As further depicted in FIG. 10, the transmission opening 1032 includes a transmission opening 1032 lower portion angled surface 1080 positioned in the distant region, on the opposite side of the transmission opening 1032 as the receiving region 1024. The lower portion angled surface 1080 is configured to transition from the upper portion 334 of the transmission opening 1032 away from the optical transmission axis 1036 at a lower portion angled surface angle 1011 as depicted in FIG. 10. The lower portion angled surface angle 1011 is between 5 degrees and 25 degrees; more preferably between 8 degrees and 22 degrees; most preferably between 10 degrees and 20 degrees. The lower portion angled surface angle 1011 prevents crosstalk optical radiation from reflecting off the lower portion of the transmission opening 1032 toward the receiving opening 1033.

As further depicted in FIG. 10, the receiving opening 1033 includes an upper portion vertical surface 1070 positioned in the transmission-side region of the receiving opening 1033 to reduce crosstalk optical radiation. As depicted in FIG. 10, the upper portion angled surface 1071 progresses into the receiving opening from the top surface 1023 (e.g., outer surface) at a receiving opening angle 1065. The receiving opening angle 1065 is the angle measured from the top surface 1023 of the housing cap 1020 to the surface of the upper portion angled surface 1071. The receiving opening angle 1065 is between 15 and 45 degrees; more preferably between 20 and 40 degrees; most preferably between 25 and 35 degrees.

In general, the receiving opening angle 1065 establishes the receiving field of view angle 1015. The receiving field of view angle 1015 is the angle at which optical radiation may be received into the receiving opening 1033. The receiving field of view angle 1015 is measured from the optical axis at the center of the receiving opening 1033 to the edge of the receiving opening 1033 at the top surface 1023. Increasing the receiving field of view angle 1015 increases the angle at which optical radiation may be received into the receiving opening 1033.

As further depicted in FIG. 10, the upper portion vertical surface 1070 is positioned at an upper portion vertical surface distance 1018 from the intersection point of the receiving opening angle 1065 with the top surface 1023. The upper portion vertical surface distance 1018 is between 0.08 millimeters and 0.145 millimeters; more preferably between 0.09 millimeters and 0.135 millimeters; most preferably between 0.1 millimeters and 0.125 millimeters. The upper portion vertical surface distance 1018 defines the height of the upper portion vertical surface 1070. In addition, as depicted in FIG. 10, the upper portion vertical surface 1070 may reduce the receiving field of view angle 1015 on the transmission side of the receiving opening 1033. Thus, the upper portion vertical surface distance 1018 is selected to reduce optical cross talk radiation received from the optical radiation source 1004 while maximizing the receiving field of view angle 1015. The upper portion vertical surface distance 1018 is selected such that the receiving field of view angle is between 55 degrees and 65 degrees; more preferably between 58 degrees and 62 degrees; most preferably between 59 degrees and 61 degrees.

Figure 11:
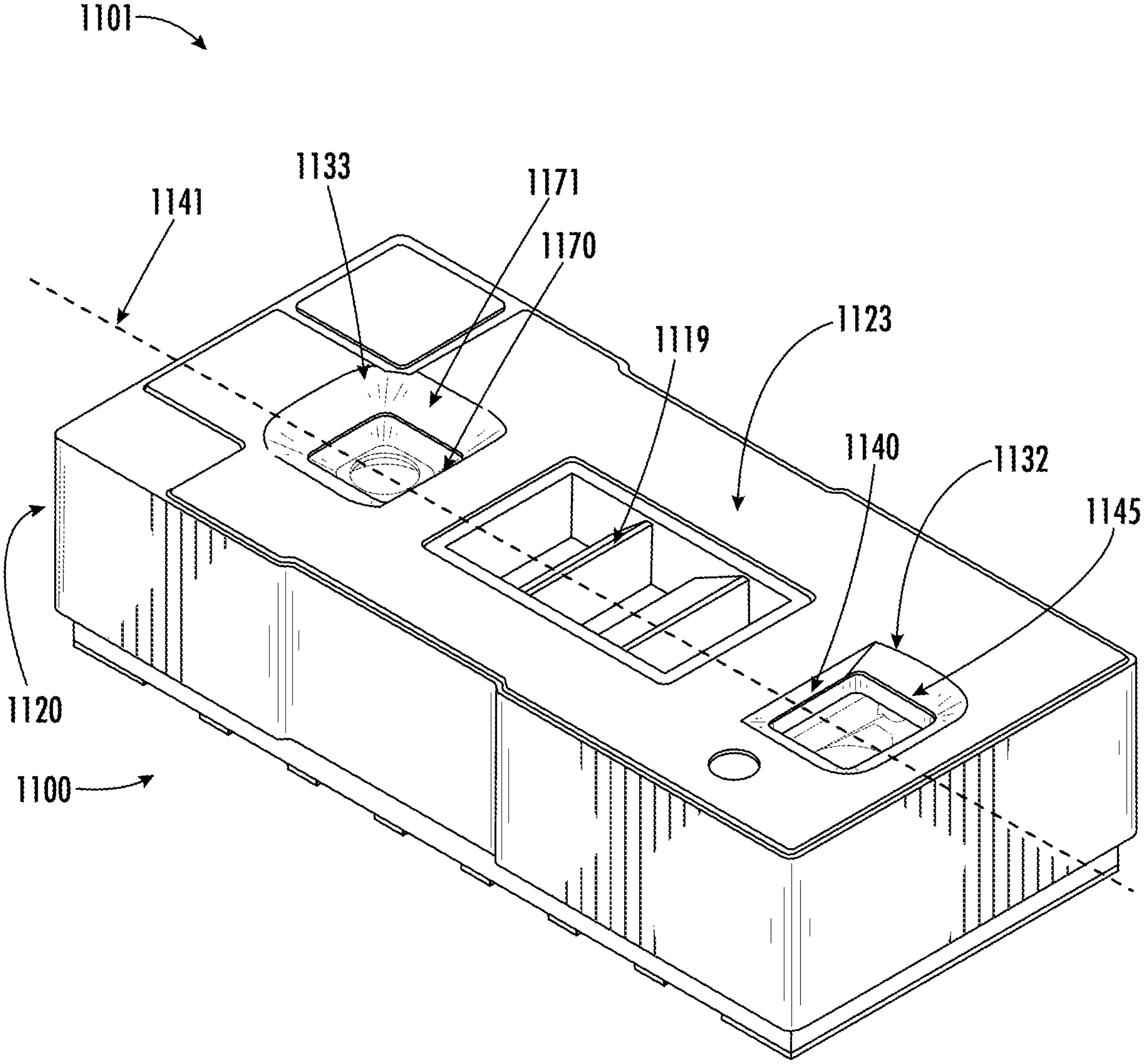
FIG. 11 illustrates a perspective view of an example optical sensor module comprising example crosstalk reducing features in accordance with an example embodiment of the present disclosure.

Referring to FIG. 11, a perspective view of an example optical sensor module 1101 comprising an optical sensor circuit board 1100 and a housing cap 1120 is provided. As depicted in FIG. 11, the housing cap 1120 of the example optical sensor module 1101 includes a transmission opening 1132 and a receiving opening 1133. The optical sensor module 1101 is configured to transmit optical radiation out of the transmission opening 1132 toward a target object and receive reflected optical radiation off the target object through the receiving opening 1133. A transmitter-receiver axis 1141 is further depicted, intersecting the center points of the transmission opening 1132 and the receiving opening 1133.

As depicted in FIG. 11, the example optical sensor module 1101 includes a number of crosstalk reducing features. The transmission opening 1132 includes an upper portion vertical surface 1140 on the region of the transmission opening 1132 proximate the receiving opening 1133. The upper portion vertical surface 1140 reduces crosstalk optical radiation emitted from the transmission opening 1132 and directed toward the receiving opening 1133. The transmission opening 1132 also includes an upper portion angled surface 1145. The upper portion angled surface 1145 enables a wide transmission angle of optical radiation to be emitted from the optical sensor module 1101.

As further depicted in FIG. 11, the example optical sensor module 1101 includes a plurality of anti-crosstalk protrusions 1119 positioned on the top surface 1123 of the housing cap 1120 between the transmission opening 1132 and the receiving opening 1133. The plurality of anti-crosstalk protrusions 1119 redirect crosstalk optical radiation away from the receiving opening 1133.

As further depicted in FIG. 11, the example optical sensor module 1101 includes an upper portion vertical surface 1170 on the side of the receiving opening 1133 proximate the transmission opening 1132. The upper portion vertical surface 1170 reduces the amount of crosstalk optical radiation received into the receiving opening 1133. The receiving opening 1133 also includes an upper portion angled surface 1171. The upper portion angled surface 1171 enables a wide receiving angle of optical radiation to be received by the optical sensor module 1101. Thus, the crosstalk reducing features reduce the amount of crosstalk received by an optical sensor module 1101 while still maintaining wide optical transmission and receiving angles.

While this detailed description has set forth some embodiments of the present invention, the appended claims cover other embodiments of the present invention which differ from the described embodiments according to various modifications and improvements. For example, one skilled in the art may recognize that such principles may be applied to any optical sensor used to determine a proximity and or range of a target object. For example, mobile devices such as phones, tablets, and laptops; wearable electronic devices such as watches and ear buds; consumer electronics such as robotic vacuums and projection systems; industrial electronics such as unmanned aerial vehicles, robotics; and so forth.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An optical sensor comprising:

an optical radiation source configured to generate optical radiation directed at a target object;

an optical radiation receiver configured to receive reflected optical radiation reflected off the target object; and a housing cap formed of a single, non-optically transmissive material, the housing cap comprising:

a transmission opening formed by the housing cap to enable transmission of a portion of the optical radiation through the transmission opening toward the target object along an optical transmission axis, the housing cap defining:

a transmission opening lower portion proximate the optical radiation source;

a transmission opening upper portion proximate a top surface of the housing cap; and a transmission opening upper portion vertical surface element defined within the transmission opening upper portion, wherein the transmission opening upper portion vertical surface element is substantially parallel to the optical transmission axis; and a transmission opening upper portion angled surface element defined within the transmission opening upper portion, wherein the transmission opening upper portion angled surface element progresses into the transmission opening from an outer surface of the housing cap at a transmission opening angle relative to the optical transmission axis; and a receiving opening formed by the housing cap to enable reception of a portion of reflected optical radiation through the receiving opening, housing cap defining:

a receiving opening lower receiving portion proximate the optical radiation receiver, the receiving opening lower receiving portion comprising a first angled surface element; and a receiving opening upper receiving portion proximate the top surface of the housing cap, the receiving opening upper receiving portion comprising a second angled surface element;

wherein at least a first portion of the receiving opening upper receiving portion comprises a receiving opening upper portion vertical surface element, wherein the receiving opening upper portion vertical surface element is substantially parallel to an optical receiving axis.

2. The optical sensor of claim 1, wherein the lower portion of the transmission opening comprises a lower portion vertical surface element, wherein the lower portion vertical surface element is substantially parallel to the optical transmission axis.

3. The optical sensor of claim 1, wherein the upper portion of the transmission opening comprises a receiver-side region proximate the optical radiation receiver, wherein the transmission opening upper portion vertical surface element is disposed within the receiver-side region of the transmission opening.

4. The optical sensor of claim 3, the transmission opening of the housing cap further comprising a transmission opening lower portion angled surface element, wherein the transmission opening lower portion angled surface element commences at an intersection of the lower portion of the transmission opening and the upper portion of the transmission opening and extends along a lower portion angled surface angle away from the optical transmission axis.

5. The optical sensor of claim 4, wherein the lower portion of the transmission opening comprises a distant region opposite the transmission opening of the receiver-side region, wherein the transmission opening lower portion angled surface element is disposed within the distant region of the transmission opening.

6. The optical sensor of claim 4, wherein the lower portion angled surface angle is between 10 degrees and 20 degrees.

7. The optical sensor of claim 1, wherein the transmission opening is symmetric about a transmitter-receiver axis, wherein the transmitter-receiver axis intersects a center of the transmission opening and a center of the receiving opening.

8. The optical sensor of claim 7, wherein the transmission opening is non-symmetric about a lateral axis, wherein the lateral axis is perpendicular to the transmitter-receiver axis, and wherein the lateral axis bisects the transmission opening.

9. The optical sensor of claim 1, wherein the transmission opening comprises a quadrilateral shape.

10. The optical sensor of claim 5, wherein the receiver-side region of the transmission opening comprises a receiver-region side.

11. The optical sensor of claim 10, wherein the transmission opening upper portion vertical surface element is disposed on the receiver-region side of the transmission opening.

12. The optical sensor of claim 11, wherein the distant region of the transmission opening comprises a distant-region side, opposite the receiver-region side.

13. The optical sensor of claim 12, wherein the transmission opening lower portion angled surface element is disposed on the distant-region side of the transmission opening.

14. The optical sensor of claim 1, wherein at least a second portion of the upper portion of the receiving opening comprises an angled surface element, wherein the angled surface element progresses into the receiving opening from the outer surface of the housing cap at a receiving opening angle.

15. The optical sensor of claim 14, wherein the receiving opening angle is between 25 degrees and 35 degrees.

16. An electronic system configured to determine a proximity of a target object, the electronic system comprising:

an external cover; and an optical sensor disposed in an internal compartment defined by the external cover, the optical sensor comprising:

an optical radiation source configured to generate optical radiation directed at the target object;

an optical radiation receiver configured to receive reflected optical radiation reflected off the target object; and a housing cap formed of a single, non-optically transmissive material, the housing cap comprising:

a transmission opening, formed by the housing cap to enable transmission of a portion of the optical radiation through the transmission opening toward the target object along an optical transmission axis, the housing cap defining:

a lower transmission opening portion proximate the optical radiation source;

a transmission opening upper portion proximate a top surface of the housing cap; and a transmission opening upper portion vertical surface element defined within the transmission opening upper portion, wherein the transmission opening upper portion vertical surface element is substantially parallel to the optical transmission axis; and a transmission opening upper portion angled surface element defined within the transmission opening upper portion, wherein the transmission opening upper portion angled surface element progresses into the transmission opening from an outer surface of the housing cap at a transmission opening angle relative to the optical transmission axis; and a receiving opening formed by the housing cap to enable reception of a portion of reflected optical radiation through the receiving opening, the housing cap defining:

a receiving opening lower receiving portion proximate the optical radiation receiver, the receiving opening lower receiving portion comprising a first angled surface element; and a receiving opening upper receiving portion proximate the top surface of the housing cap, the receiving opening upper receiving portion comprising a second angled surface element;

wherein at least a first portion of the receiving opening upper receiving portion comprises a receiving opening upper portion vertical surface element, wherein the receiving opening upper portion vertical surface element is substantially parallel to an optical receiving axis.

17. The electronic system of claim 16, the transmission opening of the housing cap further comprising a transmission opening lower portion angled surface element, wherein the transmission opening lower portion angled surface element commences at an intersection of the lower portion of the transmission opening and the upper portion of the transmission opening and extends along a lower portion angled surface angle away from the optical transmission axis.

18. The electronic system of claim 17, wherein the lower portion of the transmission opening comprises a distant region opposite the transmission opening of the receiving opening, wherein the transmission opening lower portion angled surface element is disposed within the distant region of the transmission opening.

19. The electronic system of claim 18, wherein the lower portion angled surface angle is between 10 degrees and 20 degrees.

* * * * *